(12) United States Patent
Kampf

(10) Patent No.: US 6,742,352 B2
(45) Date of Patent: Jun. 1, 2004

(54) HEAT EXCHANGER FOR A MOTOR VEHICLE AIR-CONDITIONING SYSTEM

(75) Inventor: Hans Kampf, Korb (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/156,049

(22) Filed: May 29, 2002

(65) Prior Publication Data

US 2002/0178745 A1 Dec. 5, 2002

(30) Foreign Application Priority Data

May 30, 2001 (DE) .......................... 101 26 221

(51) Int. Cl.⁷ ................................ F25D 11/00
(52) U.S. Cl. ..................... 62/430; 165/104.21
(58) Field of Search .................. 62/434, 239, 244, 62/201, 430; 165/104.21, 902

(56) References Cited

U.S. PATENT DOCUMENTS

| | | | |
|---|---|---|---|
| 4,637,222 A | * | 1/1987 | Fujiwara et al. ............. 62/244 |
| 5,277,038 A | * | 1/1994 | Carr ............................. 62/434 |
| 5,701,754 A | * | 12/1997 | Choi et al. .................... 62/244 |
| 5,901,780 A | * | 5/1999 | Zeigler et al. ................ 165/42 |
| 5,927,091 A | * | 7/1999 | Hong ............................ 62/244 |
| 6,044,656 A | * | 4/2000 | Shirota et al. ................ 62/244 |
| 6,059,016 A | * | 5/2000 | Rafalovich et al. ........... 165/41 |
| 6,089,034 A | * | 7/2000 | Lake et al. ................... 62/204 |
| 6,101,830 A | | 8/2000 | Feuerecker |
| 6,421,599 B1 | * | 7/2002 | Lippa et al. ................ 701/102 |

FOREIGN PATENT DOCUMENTS

| | | |
|---|---|---|
| DE | 195 09 787 | 9/1996 |
| DE | 197 29 497 | 1/1999 |
| DE | 197 31 071 | 1/1999 |
| DE | 197 53 601 | 6/1999 |
| DE | 198 57 121 | 6/2000 |
| DE | 199 27 518 | 1/2001 |
| EP | 7 995 621 | 4/2000 |
| WO | WO 00/66964 | 11/2000 |

* cited by examiner

*Primary Examiner*—Melvin Jones
(74) *Attorney, Agent, or Firm*—Foley & Lardner

(57) ABSTRACT

The invention relates to a heat exchanger for an air-conditioning system (54) of a motor vehicle having a plurality of conducting members (102) for a refrigerant, between which air can flow for heat exchange purposes. In order to provide a heat exchanger which supplies refrigerating output even when the compressor is switched off, the conducting members (102) are penetrated by one or more storage members (114) in which a storage medium is contained.

22 Claims, 3 Drawing Sheets

HEAT EXCHANGER FOR A MOTOR VEHICLE AIR-CONDITIONING SYSTEM

CROSS-REFERENCE TO RELATED PATENT APPLICATIONS

The right of priority under 35 U.S.C. §119(a) is claimed based on German Patent Application No. 101 26 221.3, filed May 30, 2001, the entire disclosure of which is hereby incorporated by reference.

BACKGROUND OF THE INVENTION

The invention relates to a heat exchanger for an air-conditioning system of a motor vehicle and to an air-conditioning system.

It is the aim of motor vehicle manufacturers to reduce the fuel consumption of the vehicle. One measure for reducing fuel consumption is to switch off the engine during a temporary standstill, for example, when stopping at traffic lights. This is also called idle stop operation. This measure is already used in the case of modern, low-consumption vehicles, such as, for example, in the "three liter vehicle". In the case of vehicles which have the idle stop operating mode, the engine is switched off for approximately 25–30% of the driving time in city traffic.

This is one reason why vehicles of this type are not equipped with an air-conditioning system, since when the engine is at a standstill it is also not possible to drive the compressor that is necessary for the air-conditioning system, and so an air-conditioning system cannot provide the necessary refrigeration output in the idle stop operation.

In order to solve this problem, it is proposed in EP 0 995 621 A2 to ice up the evaporator of the air-conditioning system by means of the condensate that arises when moist air cools, with the result that, in the idle stop operation when the engine is switched off, the air can be cooled by the ice which then thaws. However, this method has numerous disadvantages. The quantity of water that is present in the air and which is necessary for icing up the evaporator depends on the climatic environmental conditions. Thus, when there is little air humidity, there may not be sufficient condensation water for the icing up. Furthermore, as a rule, a relatively long period of time is required in order to ice up the evaporator, and therefore this known air-conditioning system can only work in the idle stop operation after a relatively long driving period.

A further problem is that, as a rule, the evaporator ices up unevenly, and consequently the evaporator has regions that are iced up and regions that are not iced up. Furthermore, the icing up may be so severe that the air cannot flow through the evaporator or can flow through only with a high loss of pressure. The layer of ice always produces a loss of pressure from the air, which results in the need for an increased blower output. Another disadvantage is that bacteria easily collect on moist surfaces and can cause unpleasant odors.

SUMMARY OF THE INVENTION

One object of the present invention is to provide an improved heat exchanger for a motor vehicle air-conditioning system.

Another object of the invention is to provide an improved automotive air-conditioning system.

A further object of the invention is to provide an improved method for air-conditioning the passenger compartment of a motor vehicle.

In accordance with one aspect of the present invention, there has been provided a heat exchanger for a motor vehicle air-conditioning system, comprising: a plurality of conducting members for a refrigerant, spaced apart to permit air flow between them for heat exchange purposes; and at least one storage member penetrating the conducting members and designed to contain a storage medium for storing cold extracted from the refrigerant.

In accordance with another aspect of the invention, there is provided an air-conditioning system for a motor vehicle, comprising a compressor and an evaporator, wherein the evaporator comprises a heat exchanger as defined above.

According to still another aspect of the invention, there has been provided a method for air-conditioning a passenger compartment of a motor vehicle, comprising: providing an air-conditioning system as defined above; while the compressor is operating, storing cold in the storage medium contained in the storage members; and at least while the compressor is not operating, extracting cold from the storage medium contained in the storage members to air-condition air provided to the vehicle passenger compartment.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 3:
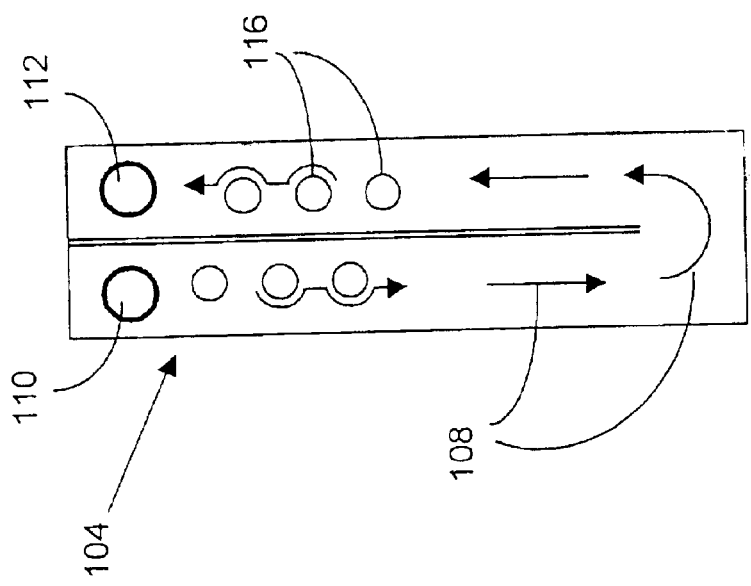
FIG. 3 is a schematic cross-sectional view showing a conducting member.

The invention provides a heat exchanger which supplies refrigerating output even when the compressor is switched off and with which the above-mentioned disadvantages can be avoided to the greatest possible extent. An air-conditioning system is also provided which contains this heat exchanger and which ensures that the vehicle is air-conditioned in all operating and environmental conditions, including the idle stop situation.

The heat exchanger according to the invention has a conventional conducting member for a refrigerant, for example, flat pipes, between which air can flow for the purpose of heat exchange with the refrigerant. The conducting members are penetrated by one or more storage members in which a storage medium is contained. This advantageously provides a heat exchanger which is able to bring about cooling of the air when the compressor of the air-conditioning system is operating, in which case the storage medium is cooled at the same time, with the result that even when the compressor is switched off, the air can continue to be cooled. This heat exchanger therefore forms a combination of refrigerant store and evaporator and will also be called storage evaporator below.

In order to be able to make recourse to tried and tested construction principles, the conducting members are advantageously formed as flat pipes or by passageways formed between a pair of plates in each case.

Flat pipes or plates can also easily be penetrated by the storage member(s), whereby the storage members are preferably designed as pipes which run transversely with respect to the conducting members and pass through the conducting members.

The storage members preferably penetrate all of the conducting members, with the result that the storage medium can be optimally cooled by the refrigerant flowing in the conducting members.

In an advantageous manner, conducting members and storage members are brazed or soldered to one another, so that a good transmission of heat is produced.

If the storage members are designed as turbulence generators for the air flowing through the heat exchanger, corrugated fins, which are otherwise conventional, between the conducting members can be omitted. This simplifies the installation and saves on material, parts and costs.

It is advantageous if the storage members are arranged parallel and offset with respect to one another, and preferably are offset with gaps, to facilitate the most effective circulation of air around all of the storage members.

In order to increase the heat exchange output, fins may additionally be provided if the storage members leave sufficient space between the conducting members.

In one cost preferred embodiment, the storage medium essentially contains water, preferably a water-glysanthine mixture.

Preferably, the storage medium has a phase transition at approximately 3 to 7° C., whereby the storage medium can be "charged up" with cold even in normal operation of the air-conditioning system, in which the heat exchanger has a surface temperature of greater than 0° C., in order to prevent the evaporator from icing up. A single evaporator can then be used both for normal cooling operation, i.e., while the engine and therefore the compressor are operating, and also for storage operation, i.e., a cooling operation while the engine is at a standstill.

The invention will be explained in detail below with respect to several preferred exemplary embodiments and with reference to the drawings.

Turning now to the drawings, a heat exchanger 100 according to the invention comprises conducting members 102 for a refrigerant, which can be designed, for example, as flat pipes or, preferably, can be constructed by means of pairs of plates 104 (FIG. 3). A pair of plates 106 in each case forms a U-shaped flow duct in which the refrigerant is guided in a U-shaped manner corresponding to the arrows 108. The pairs of plates 106 are connected to one another in order to form inflow and outflow collecting passageways 110 and 112, which in turn can be connected to refrigerant conduits in a suitable manner which is not illustrated further. Air can flow between the respectively adjacent pairs of plates 106 for heat exchange purposes. A plate-type heat exchanger of this type is disclosed, for example, in DE 195 09 787 A1, the disclosure of which is hereby incorporated by reference.

Figure 2:
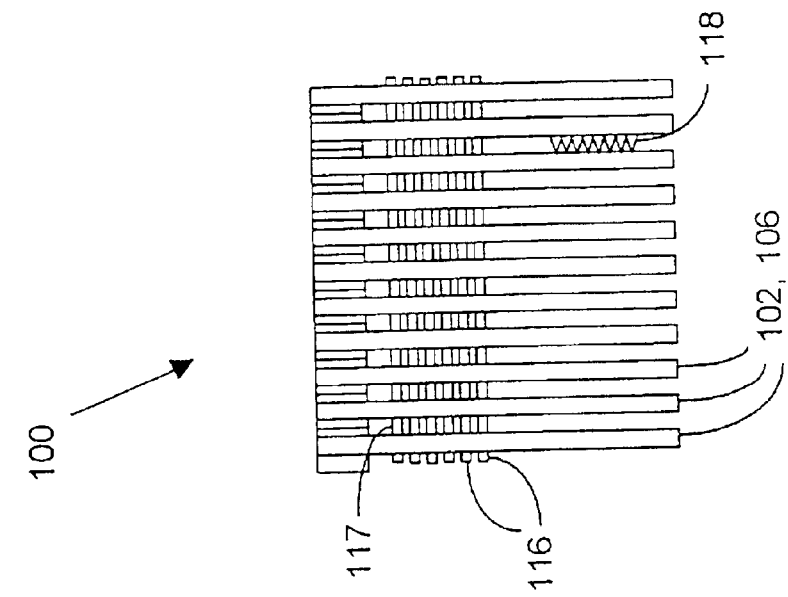
FIG. 2 is a frontal view showing the heat exchanger in the direction of air flow.
Figure 1:
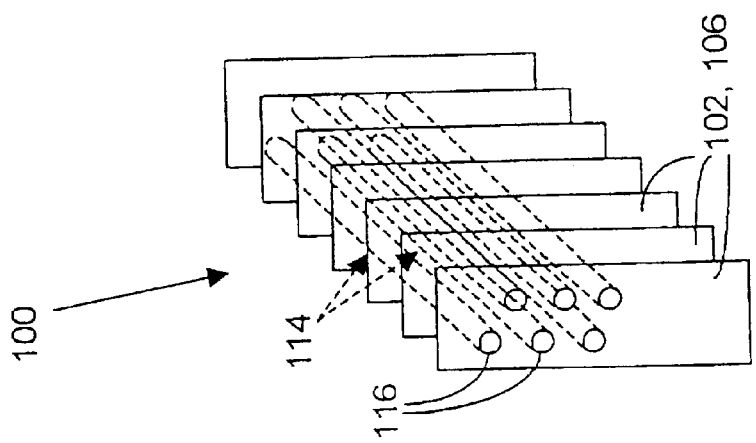
FIG. 1 is a schematic view showing a heat exchanger according to the invention.

According to the invention, the conducting members 102, i.e., the pairs of plates 106 in the exemplary embodiment illustrated in FIGS. 1 to 3, are penetrated by storage member(s) 114. The storage members 114 are preferably designed as pipes 116 which are inserted through the pairs of plates 106 and are brazed tightly to the latter. In this case, preferably all of the conducting members 102 are penetrated by each pipe 116. For better clarity, only a few of the pipes 116 are illustrated in FIGS. 1 to 3. The cross section of the pipes 116 can have a round, angular, oval or other known shape. The pipes 116 are preferably arranged offset with respect to one another and running parallel with gaps, as illustrated in FIGS. 1 and 3. The total number of pipes 116 in a heat exchanger 100 according to the invention and the size of their cross section can be matched to the respective specifications for the heat exchanger 100 via optimization calculations and/or trials, which are routine in this field.

The storage members 114 are closed containers that contain a storage medium which preferably essentially comprises water. By means of heat exchange with the refrigerant, which circulates around the pipes 116 within the conducting members 102 (FIG. 3), the storage medium is preferably frozen, in which case air flowing through the heat exchanger 100 can be cooled at the same time by the air circulating around those sections 117 of the pipes 116 that are placed between the conducting members 102. If a compressor conveying the refrigerant is no longer working, the heat exchanger 100 according to the invention can continue to cool the air by heat exchange between the air and the storage medium.

The storage members 114 are preferably designed and/or arranged in such a manner that the air flowing between the conducting members is caused to swirl, for the purpose of improved heat exchange with the refrigerant or storage medium. In addition, in one preferred embodiment of the invention, a fin, for example a corrugated fin, can be provided between adjacent pairs of plates 106, as is indicated in FIG. 2 at reference number 118.

Figure 4:
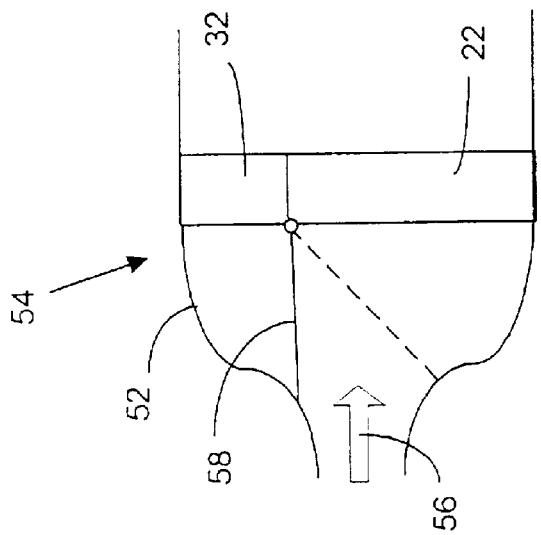
FIGS. 4 and 6 are detailed schematic cross-sectional views showing part of the air-conditioning device containing an evaporator.

FIG. 4 shows one possible arrangement of a heat exchanger according to the invention in an air-conditioning device 54. The heat exchanger according to the invention operates as a storage evaporator 32. In addition to the storage evaporator 32, a further "conventional" evaporator 22 of known type is also provided. The two evaporators 22 and 32 are used for cooling the air. The evaporators 22 and 32 are arranged in a known manner in an air guiding housing 52 of the air-conditioning device 54. Air-conditioning devices of this type are situated as a rule in the dashboard of the motor vehicle. A blower (not illustrated further) can be used to convey air through the evaporators 22 and 32 in the direction of arrow 56. The part of the air-conditioning device 54 which adjoins downstream of the evaporators on the air side and in which, as a rule, a heating element and various air flaps and air ducts to the individual air outlets are arranged, is not illustrated further in FIG. 2 for the sake of clarity, but is understood to be part of the air-conditioning system according to the invention. On the air side upstream of the evaporators 22 and 32, an air flow control element 58 is arranged in such a manner that, in a first end position of the air flow control element 58, the air is guided through the first evaporator 22 and, in a second end position (dashed line in FIG. 4), the air is guided through the storage evaporator 32.

Figure 5:
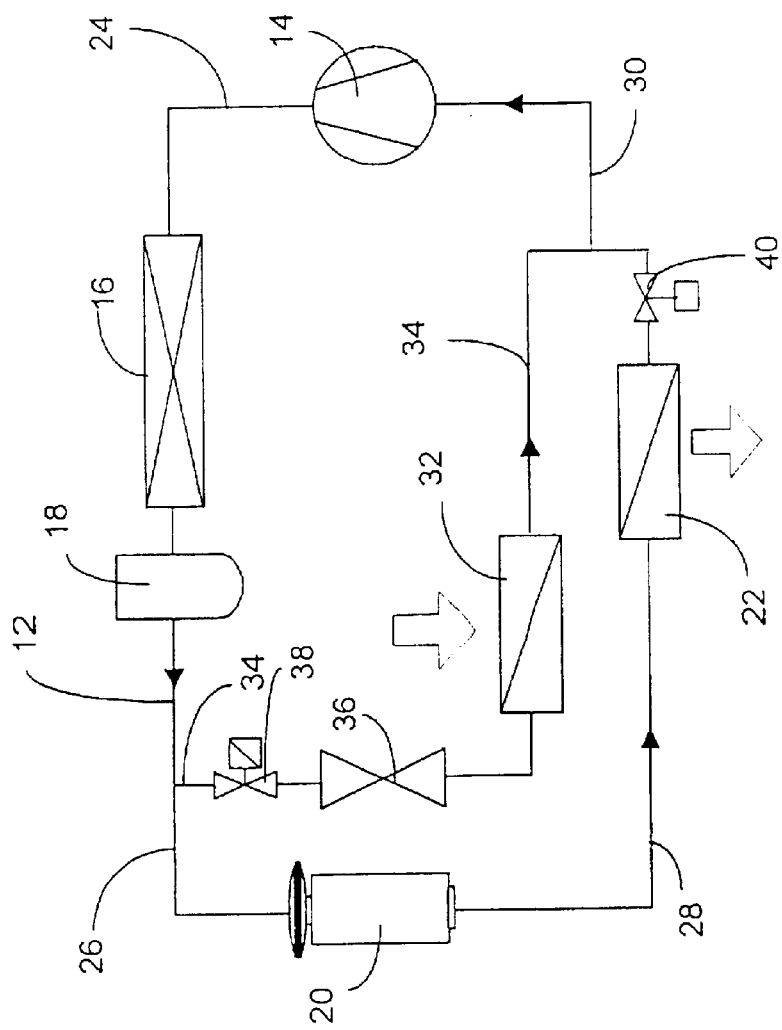
FIGS. 5 and 7 are schematic block diagrams showing a refrigerant circuit of an air-conditioning system according to the invention.

The refrigerant circuit 12 associated with the air-conditioning device 54 is shown schematically in FIG. 5 and comprises a compressor 14, a refrigerant condenser 16, a refrigerant collector 18, an expansion valve 20 and the evaporator 22, which are connected to one another via refrigerant conduits 24, 26, 28 and 30. On the refrigerant side parallel to the first evaporator 22, the storage evaporator 32 is connected into the refrigerant circuit 12. A refrigerant conduit 34 which opens downstream of the first evaporator 22 into the refrigerant line 30 branches off from the refrigerant conduit 26. An expansion element 36 and a shut-off valve 38 are arranged in the refrigerant conduit 34 upstream of the storage evaporator 32. The refrigerant flow through the storage evaporator 32 can be blocked via the shut-off valve 38. Similarly, a shut-off valve 40 is provided downstream of the first evaporator 22, so that the refrigerant flow through the first evaporator 22 can also be shut off. The separate guiding of refrigerant through the storage evaporator 32 enables the temperature of the refrigerant to be set lower in the storage evaporator 32 than in the conventional evaporator 22, with the result that the storage medium can optimally be "loaded" with cold.

The first evaporator 22 can be constructed in a known manner (which is not illustrated further). Thus, for example, it can be a flat tube evaporator in which flat tubes or pipes connected parallel on the refrigerant side extend between two collecting pipes and in which heat-dissipating corrugated fins are provided between the flat tubes. An evaporator of this type is disclosed, for example, in DE 197 29 497 A1, the disclosure of which is hereby incorporated by reference. Similarly, the evaporator 22 can alternatively be designed as a plate-type evaporator.

If the engine of the motor vehicle and therefore the compressor 14 are operating, the air flow control element 58 is situated in its first end position, and the air is cooled by the first evaporator 22 in a conventional evaporator operation. If the compressor is at a standstill, the air flow control element 58 can be brought into the second end position, with the result that the air can then be cooled via the storage evaporator 32.

In the exemplary embodiment illustrated, the two evaporators 22 and 32 are two individual evaporators. In a further embodiment, which is not illustrated in detail, the two evaporators 22 and 32 may, however, also form a common constructional unit, and in this embodiment the evaporator is a single evaporator having two sub-regions, the first sub-region corresponding to the evaporator 22 and merely having refrigerant evaporating properties, and the second sub-region corresponding to the storage evaporator and additionally having the storage member(s) containing the storage medium.

Figure 6:
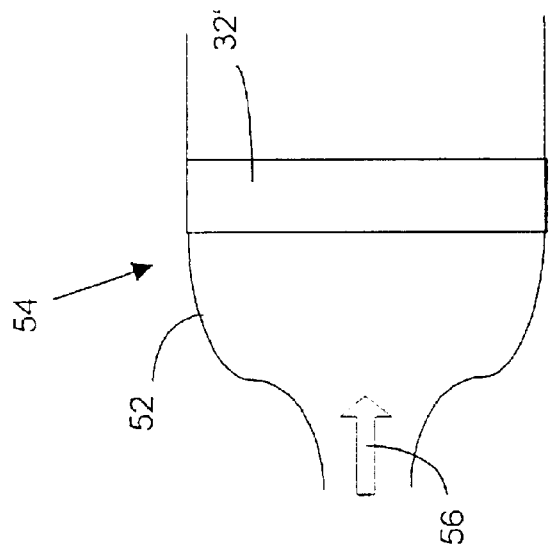

In a further embodiment of the invention, which is illustrated in FIG. 6, there is provided as the sole cooling heat exchanger one evaporator 32', which is constructed according to the invention. The evaporator 32' permits both a conventional evaporator operation and a storage operation. Since the cold storage is loaded during the conventional evaporator operation, i.e., the storage medium is to be frozen and the conventional evaporator operation takes place at evaporator surface temperatures T>0° C. in order to prevent the evaporator from icing up, a storage medium is preferably used which has a phase change at approximately 3 to 7° C.

Figure 7:
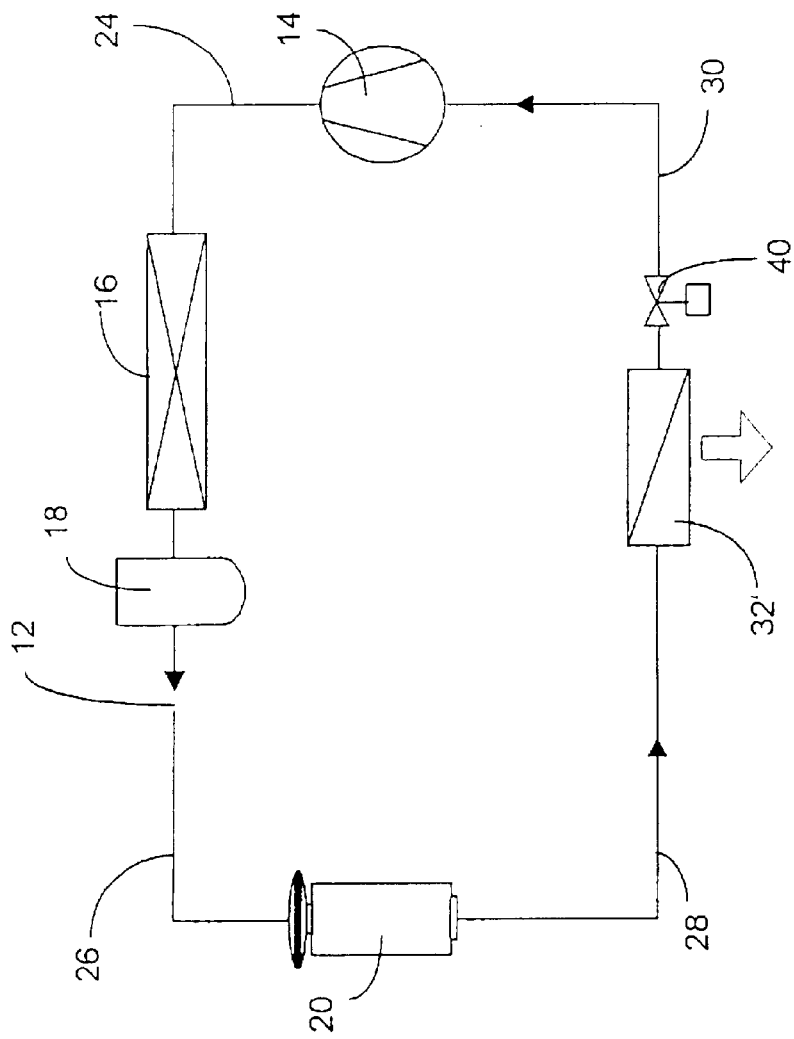

The associated refrigerant circuit is illustrated in FIG. 7 and differs from the one illustrated in FIG. 5 only to the extent of omitting the secondary branch containing the separate storage evaporator.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An air-conditioning system for a motor vehicle, comprising:
   a compressor; and
   a first evaporator comprising a first heat exchanger,
   wherein the first heat exchanger comprises:
      a plurality of conducting members for a refrigerant, spaced apart to permit air flow between them for heat exchange purposes; and
      at least one storage member penetrating the conducting members and designed to contain a storage medium for storing cold extracted from the refrigerant.

2. The air-conditioning system as claimed in claim 1, wherein the heat exchanger forms the sole cooling heat exchanger of the air-conditioning system.

3. An air-conditioning system as claimed in claim 1, further comprising a second evaporator comprising a second heat exchanger.

4. An air-conditioning system as claimed in claim 3, further comprising an air flow control element configured to selectively guide air through said first heat exchanger in a first end position and through said second heat exchanger in a second end position.

5. An air-conditioning system as claimed in claim 1, wherein said storage members are in direct heat exchange contact with air provided to a vehicle passenger compartment.

6. A heat exchanger for a motor vehicle air-conditioning system, comprising:
   a plurality of conducting members for a refrigerant, spaced apart to permit air flow between them for heat exchange purposes; and
   at least one storage member penetrating the conducting members and designed to contain a storage medium for storing cold extracted from the refrigerant.

7. A heat exchanger as claimed in claim 6, wherein the conducting members comprise flat pipes.

8. A heat exchanger as claimed in claim 6, wherein the conducting members are each formed by a pair of plates.

9. A heat exchanger as claimed in claim 6, wherein the storage members comprise pipes which run transversely with respect to the conducting members and which are inserted through the conducting members.

10. A heat exchanger as claimed in claim 6, wherein the storage members penetrate all of the conducting members.

11. A heat exchanger as claimed in claim 6, wherein the storage members are brazed to the conducting members.

12. A heat exchanger as claimed in claim 6, wherein the storage members are designed and arranged as turbulence generators for air flowing through the heat exchanger.

13. A heat exchanger as claimed in claim 12, wherein the storage members are arranged running parallel to one another and offset with respect to one another.

14. A heat exchanger as claimed in claim 6, further comprising fins arranged between the conducting members.

15. A heat exchanger as claimed in claim 6, wherein the storage medium essentially comprises water.

16. A heat exchanger as claimed in claim 15, wherein the storage medium has a phase transition in a temperature range of approximately 3 to 7° C.

17. A heat exchanger as in claim 6, wherein the storage members are inserted through the conducting members.

18. A heat exchanger as in claim 17, wherein the storage members pass completely through the conducting members.

19. A heat exchanger as in claim 6, wherein the heat exchanger comprises an air/refrigerant heat exchanger for directly exchanging heat between the air side and refrigerant flowing in said conducting member.

20. A heat exchanger as in claim 19, wherein the heat exchanger comprises an evaporator adapted for cooling air supplied to a vehicle passenger compartment.

21. A method for air-conditioning a passenger compartment of a motor vehicle, comprising:
(a) providing an air-conditioning system comprising:
a compressor; and
a first evaporator comprising a first heat exchanger, wherein the first heat exchanger comprises:
a plurality of conducting members for a refrigerant, spaced apart to permit air flow between them for heat exchange purposes; and
at least one storage member penetrating the conducting members and designed to contain a storage medium for storing cold extracted from the refrigerant;
(b) while the compressor is operating, storing cold in the storage medium contained in the storage members; and
(c) at least while the compressor is not operating, extracting cold from the storage medium contained in the storage members to air-condition air provided to a vehicle passenger compartment.

22. A method as in claim 21, wherein said air-conditioning system further comprises a second evaporator comprising a second heat exchanger, further comprising adjusting said first and second evaporators so that, while said compressor is operating, a temperature of said refrigerant in said first evaporator is lower than a temperature of said refrigerant in said second evaporator.

* * * * *